United States Patent
Baldwin

(10) Patent No.: US 9,788,302 B2
(45) Date of Patent: Oct. 10, 2017

(54) METHOD AND APPARATUS FOR DELIVERING MEDIA CONTENT AND BACKUP MEDIA CONTENT USING MULTIPLE NETWORKS

(71) Applicant: AT&T Intellectual Property I, LP, Atlanta, GA (US)

(72) Inventor: Christopher Baldwin, Algonquin, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 177 days.

(21) Appl. No.: 14/556,383

(22) Filed: Dec. 1, 2014

(65) Prior Publication Data
US 2016/0157209 A1 Jun. 2, 2016

(51) Int. Cl.
*H04W 72/00* (2009.01)
*H04L 1/08* (2006.01)
(Continued)

(52) U.S. Cl.
CPC .......... *H04W 72/005* (2013.01); *H04H 20/24* (2013.01); *H04L 1/08* (2013.01);
(Continued)

(58) Field of Classification Search
CPC . H04W 72/005; H04W 72/085; H04W 28/16; H04W 4/06; H04W 76/00; H04W 72/0453; H04W 72/044; H04H 20/24; H04L 1/08; H04L 65/4076; H04L 12/2834; H04L 12/16; H04L 12/18; H04L 12/189; H04N 21/6131
See application file for complete search history.

(56) References Cited

U.S. PATENT DOCUMENTS 7,415,241 B2 8/2008 Oprescu-Surcobe et al.
8,724,639 B2 5/2014 Mahmoud
(Continued)

FOREIGN PATENT DOCUMENTS

EP 2012448 A2 1/2009
WO 2007074214 A1 7/2007
WO 2014032291 A1 3/2014

OTHER PUBLICATIONS

"EBU Operating Eurovision and Euroradio", TR 027, Delivery of Broadcast Content Over LTE Networks, Technical Report, Jul. 2014, 89 pages.
(Continued)

*Primary Examiner* — Charles C Jiang
*Assistant Examiner* — Rose Clark
(74) *Attorney, Agent, or Firm* — Guntin & Gust, PLC; Atanu Das

(57) ABSTRACT

Aspects of the subject disclosure may include, for example, providing a content stream to a media processor over a first network where the content stream comprises first media content, evaluating a quality of the first media content according to a quality threshold, and responsive to a determination that the quality of the first media content does not satisfy the quality threshold, providing to a cellular device second media content over a multicast-broadcast single-frequency network channel of a cellular network. Other embodiments are disclosed.

17 Claims, 6 Drawing Sheets

(51) Int. Cl.
    *H04W 72/08*     (2009.01)
    *H04L 29/06*     (2006.01)
    *H04H 20/24*     (2008.01)
    *H04N 21/61*     (2011.01)

(52) U.S. Cl.
    CPC ..... *H04L 65/4076* (2013.01); *H04N 21/6131* (2013.01); *H04W 72/085* (2013.01)

(56) References Cited

U.S. PATENT DOCUMENTS

| | | |
|---|---|---|
| 8,819,742 B2 | 8/2014 | Dey |
| 2005/0153650 A1 | 7/2005 | Hikomoto et al. |
| 2011/0086620 A1 | 4/2011 | De Pasquale et al. |
| 2011/0113455 A1 | 5/2011 | Wu |
| 2011/0149753 A1 | 6/2011 | Bapst et al. |
| 2012/0084825 A1 | 4/2012 | Sharma et al. |
| 2013/0040691 A1* | 2/2013 | Ode ............... H04B 7/022 455/524 |
| 2013/0044668 A1* | 2/2013 | Purnadi ......... H04W 36/0055 370/312 |
| 2013/0190048 A1 | 7/2013 | Oyman |
| 2013/0276017 A1 | 10/2013 | Walker et al. |
| 2013/0294316 A1 | 11/2013 | Amerga et al. |
| 2014/0003322 A1 | 1/2014 | Grinshpun et al. |
| 2014/0038606 A1 | 2/2014 | Jang |
| 2014/0177437 A1* | 6/2014 | Korus ............... H04W 76/00 370/230 |
| 2014/0184921 A1 | 7/2014 | Sugiyama et al. |
| 2014/0241229 A1 | 8/2014 | Bertorelle et al. |
| 2015/0078179 A1* | 3/2015 | Lui ................. H04W 4/06 370/252 |
| 2016/0119762 A1* | 4/2016 | Zhu ................ H04W 4/10 370/312 |

OTHER PUBLICATIONS

"Moving to the Media Cloud", Intel / HP, Nov. 2010, 10 pages.
"International Search Report and Written Opinion", PCT/US2015/060269, Feb. 26, 2016, 15 pages.
Hornsby, et al., "Prototype Network Selection and Handover Algorithms", Pluto Deliverable 2.2, Jan. 10, 2006, 1-51.

\* cited by examiner

METHOD AND APPARATUS FOR DELIVERING MEDIA CONTENT AND BACKUP MEDIA CONTENT USING MULTIPLE NETWORKS

FIELD OF THE DISCLOSURE

The subject disclosure relates to a method and apparatus for delivering media content and backup media content using multiple networks.

BACKGROUND

Broadcasting of media content can be an efficient delivery method for delivering content to a large numbers of end user devices. However, broadcasting can have drawbacks including being impaired by poor weather, such as directly impaired during a satellite broadcast or indirectly impaired during a cable broadcast due in part to aging infrastructure.

Impairments can result in extended outages. In some areas, broadcast media may be the preferred or even only means of receiving updates on weather and other emergency conditions.

BRIEF DESCRIPTION OF THE DRAWINGS

Reference will now be made to the accompanying drawings, which are not necessarily drawn to scale, and wherein.

DETAILED DESCRIPTION

Figure 1:
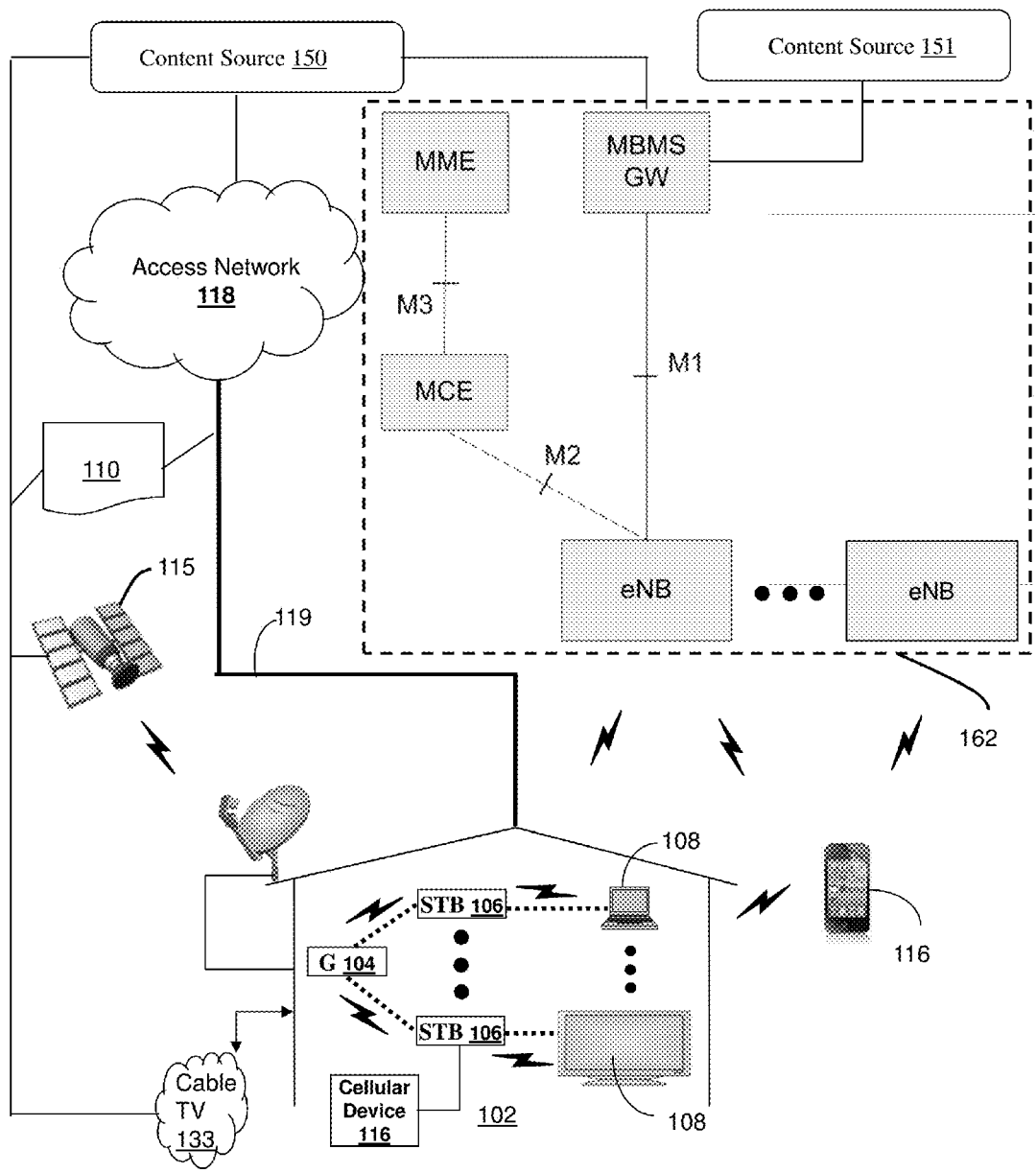
FIGS. 1 and 2 depict illustrative embodiments of systems that deliver media content and backup media content using multiple networks over different communication paths.

The subject disclosure describes, among other things, illustrative embodiments for delivering media content to end user devices where a communication path is selected according to monitoring quality of content (such as being delivered over multiple networks and multiple communication paths) and/or according to satisfying quality thresholds for the media content. Other embodiments are described in the subject disclosure.

One or more aspects of the subject disclosure include transitioning delivery of media services, such as delivering media content, from a first network (e.g., a satellite or cable broadcast) to a second network (e.g., a cellular transmission such as a Long Term Evolution (LTE) Broadcast/Multicast). One or more embodiments can utilize a parallel transmission path to the end user device(s) (e.g., a media processor such as a set top box) which enables delivery of media content during undesired conditions, such as a network failure or outage, maintenance activities, restoration activities and/or another impairment (e.g., caused by network equipment and/or caused by end user equipment). In one or more embodiments, the communication path which delivers the media content with the highest quality and/or with a quality that satisfies a quality threshold can be utilized by the media processor for receiving and presenting the media content. In one or more embodiments, the back-up content provided can be the same content as the content originally being provided. The same content can include video and/or audio content having the same format or can have different formats.

In one or more embodiments, a cellular connection can be established with a cellular device in communication with the media processor. For instance, the cellular device can be a cellular circuit that is integrated into the media processor (or other end user equipment). In another embodiment, the cellular device can be a separate device that is in communication with the media processor, such as a mobile device that receives the media content over the cellular network and then transmits the media content to the media processor utilizing another mode of communication, such as a short range wireless mode (e.g., WiFi).

In one or more embodiments, initiating a transfer between communication paths, such as from an interactive television system broadcast to a cellular transmission, can be accomplished in several ways such as based on a network-triggered technique or an end user equipment-triggered technique. For instance, a geographic area experiencing an outage or poorly received signal can be identified by the network. The network can then transmit a request to cellular provider equipment to trigger or otherwise cause transmission of a cellular transmission (such as utilizing a multicast-broadcast single-frequency network channel of a cellular network). The trigger message provided by the network may include a geographic area experiencing the outage or poor quality. In one embodiment, the cellular provider equipment can use location-based services to identify which associated user equipment is within the area and restrict reception of the cellular broadcast to those devices. The media content provided by the cellular provider equipment can be the same media content that was being delivered by the network. In one embodiment, the content delivered via the interactive television network and the content delivered via the cellular provider device can be the same content but in different formats (e.g., different resolutions, different coding, different advertisements and so forth). In one or more embodiments, an interactive television network can utilize the parallel cellular transmission path during maintenance activities to enable subscribers to continue to receive content.

In another example, the user equipment (e.g., a media processor) can monitor the received signal according to one or more quality metrics. If the media processor determines that the received signal and/or the media content therein does not satisfy a quality threshold, then the media processor can transmit a content request, such as to the cellular provider equipment and/or to the interactive television network, which triggers or otherwise causes the cellular transmission of the content. In one embodiment, the user equipment can continue to monitor the quality (or other metric) of the signal or of the content received via the interactive television network (e.g., an interactive television broadcast). If the signal or content improves such that the quality threshold is satisfied, then the media processor can transmit a message to the cellular provider equipment to cause the cellular provider equipment to cease transmission for that media processor. In this example, the media processor can then utilize the interactive television signal for presenting the content. The media content delivered by the cellular provider equipment can be obtained from the interactive television network, from a content source of the cellular provider, and/or from a third party source.

In another embodiment, the interactive television network can utilize the parallel cellular transmission path during emergency transmissions to increase the likelihood that the end user device is receiving the highest quality emergency message.

One embodiment of the subject disclosure includes a media processor including a processor circuit and a memory that stores executable instructions that, when executed by the processor circuit, facilitate performance of operations. The processor can receive, over a first network, a content stream comprising first media content. The processor can evaluate a quality of the first media content according to a quality threshold. The processor can transmit a content request responsive to a first determination that the quality of the first media content does not satisfy the quality threshold. The processor can, responsive to the content request, receive, via a cellular device, second media content over a multicast-broadcast single-frequency network channel of a cellular network, where the second media content corresponds with the first media content. The processor can present, via a display, the second media content. The processor can, responsive to a second determination that the quality of the first media content satisfies the quality threshold, cease the presenting of the second media content and presenting, via the display, the first media content.

One embodiment of the subject disclosure is a method including providing, by a system including a processor, a content stream to a media processor over a first network, wherein the content stream comprises first media content. The method includes evaluating, by the system, a quality of the first media content according to a quality threshold. The method includes, responsive to a determination that the quality of the first media content does not satisfy the quality threshold, providing, by the system to a cellular device, second media content over a multicast-broadcast single-frequency network channel of a cellular network. The second media content can correspond with the first media content. The cellular device can be in communication with the media processor. The providing of the second media content can cause the media processor to replace a first presentation of the first media content with a second presentation of the second media content.

One embodiment of the subject disclosure includes a machine-readable storage device, comprising executable instructions that, when executed by a processor, facilitate performance of operations, including providing a content stream to a media processor over a first network, wherein the content stream comprises first media content. The processor can monitor maintenance events associated with the first network. The processor can, responsive to a determination that a maintenance event affects the providing of the content stream to the media processor, transmit a content transmission request to a network device of a cellular network that causes the network device to transmit second media content over a multicast-broadcast single-frequency network channel of the cellular network to the media processor via a cellular device. The second media content can correspond with the first media content. The cellular device can be in communication with the media processor. The transmitting of the content transmission request can cause the media processor to replace a first presentation of the first media content with a second presentation of the second media content.

FIG. 1 depicts an illustrative embodiment of a system 100 that enables media services, such as delivery of media content, to be provided to end user equipment via multiple communication paths that are over different networks. System 100 can include user equipment, such as a media processor 106 (e.g., a set top box or a television with a processor integrated therein) that receives a media stream 110 which includes media content. Various user equipment can be utilized to facilitate receiving the media stream 110, such as a residential gateway 104. In one embodiment, the media processor 106 can be connected with a display 108 for presentation of the media content. The user equipment can be at a location 102, which can be a residence. However, location 102 can be various other types of locations, including a business, a public place (e.g., a stadium or a park), a vehicle, and so forth.

The media stream 110 can be received from a content source 150 over one or more of various networks, such as a satellite network 115, an Internet Protocol Television Network that includes access network 118, a cable network 133, an over-the-air network and/or any other network that provides television or video services. The delivery method for the media stream 110 can vary including broadcast, multicast, or unicast.

The system 100 can include a cellular network 162 that enables establishing another communication path for delivery of the media content to the media processor 106 via a cellular device 116 associated with the media processor, such as responsive to a determination that the media content 110 no longer satisfies a quality threshold. The cellular device 116 can be a cellular receiver, transmitter and/or transceiver circuit that is integrated into the media processor 106 or can be a separate device that has a cellular receiver, transmitter and/or transceiver circuit, such as a mobile phone. In one embodiment, the mobile phone 116 can communicate with cellular provider equipment via the cellular network 162 and can communicate with the media processor 106 utilizing a different mode of communication, such as WiFi.

The evaluation of the media content quality can be performed according to various techniques. For instance, one or more of full reference methods, reduced reference methods, and/or no-reference methods can be employed. As an example, full reference method metrics can compute the quality difference by comparing every pixel in each image of the distorted video to its corresponding pixel in an original video. Reduced reference method metrics can extract some features of both videos and compare them to give a quality score. No-reference method metrics can assess the quality of a distorted video without any reference to the original video, such as based on the video coding method utilized. In one embodiment, the quality of the media content can be evaluated based on signal-to-noise ratio (SNR) and/or peak signal-to-noise ratio (PSNR) between the original video signal and the signal transmitted through the interactive television network. Other metrics can include Universal Quality Index (UQI), Visual Quality Metric (VQM), Perceptual Evaluation of Video Quality (PEVQ), Structural Similarity (SSIM) index, objective perceptual multimedia video quality measurement of HDTV (VQuad-HD) and/or Czenakoski Distance (CZD). In other embodiments, the quality evaluation can be performed by computing a correlation between objective scores and subjective test results called mean opinion score (MOS). For example, correlation coefficients can be employed for the evaluation including linear correlation coefficient, Spearman's rank correlation coefficient, kurtosis, kappa coefficient and/or outliers ratio.

The cellular network 162 can obtain the media content directly from the content source 150 and/or from another content source 151.

In this example, the cellular network 162 can be utilized to deliver media content to one or more users in a service area. In one embodiment, the cellular network can utilize a Multimedia Broadcast multicast service Single Frequency Network (MBSFN) for delivering the target advertisements to the media processor 106 and the service area can correspond to an MBSFN area. The cellular network can include various network elements including a Mobility Management Entity (MME), a Multicell Coordination Entity (MCE), a gateway (MBMS GW), eNode-Bs (eNBs), and so forth.

In one embodiment, the cellular network 162 can utilize a communication channel of an MBSFN (e.g., a Long Term Evolution (LTE) broadcast). The MBSFN communications can enable multiple users to receive the same content simultaneously. MBSFN is a transmission mode that can utilize an OFDM radio interface to send multicast or broadcast data as a multi-cell transmission over a synchronized single-frequency network (SFN). The transmissions from the multiple cells can be sufficiently synchronized so that each arrives at the end user device within the OFDM cyclic prefix so as to avoid inter-symbol interference.

For example, an LTE broadcast over cellular network 162 can deliver the media content to multiple users, such as where the quality of the media content received by user equipment for each of the users has fallen below a quality threshold. In one embodiment, the cellular network 162 can utilize eMBMS (evolved Multimedia Broadcast Multicast Service) to deliver the media content via broadcast/multicast services. In another embodiment, the cellular network 162 can utilize High Efficiency Video Coding (HEVC) for video compression to deliver the media content. In yet another embodiment, the cellular network 162 can utilize MPEG Dynamic Adaptive Streaming over HTTP (DASH) in the delivery of the media content.

As an example, the eMBMS service can transmit the media content into a limited area where viewers (such as a subset of subscribers that are experiencing a low quality of the received content) currently are located. In one embodiment, the eMBMS service provides for the media content being only transmitted once in each cell. In another embodiment, the cellular network 162 can utilize Dynamic Single Frequency Networks (DSFN), which dynamically form single-frequency networks (SFNs), i.e., groups of adjacent base stations that send the same signal simultaneously on the same frequency sub-carriers, when there are intended recipients of the same media content in the adjacent cells.

In response to a determination that the content received via the interactive television network has fallen below a quality threshold, the eMBMS service can send the media content to all users in a cell (broadcast) or to a given set of users in a cell (multicast) using a subset of the available radio resources with the remaining available to support transmissions towards a particular user (unicast services). The eMBMS service can be different from IP-level broadcast or multicast, which offer no sharing of resources on the radio access level. In eMBMS service, it is possible to either use a single eNode-B or multiple eNode-Bs (via MBSFN) for transmission to multiple end user devices.

The cellular network 162 can utilize MBMS service including an MBMS Bearer Service and an MBMS User Service, and the service can be offered over UTRAN (i.e., WCDMA, TD-CDMA and TD-SCDMA) and LTE. The MBMS Bearer Service can include a Multicast and/or a Broadcast Mode. The MBMS Bearer Service can use IP multicast addresses for the IP flows. The MBMS Bearer Service can share the transmission resources in the core and radio network. For example, one MBMS packet flow can be replicated by GGSN, SGSN and RNCs.

In one embodiment, the media processor 106 can determine that the quality of the media content received over the interactive television network (e.g., IPTV network, satellite network 115, cable TV network 133) falls below a quality threshold and can transmit a content request over the cellular network 162 to the content source 150 and/or the content source 151. The receiving of the media content by the media processor 106 over the cellular network 162 can be responsive to the content request. In another embodiment, the media processor 106 can make the below-threshold quality determination and can transmit a content request to provider equipment of the interactive television network which then triggers the transmission of the content over the cellular network 162, such as from the same content source 150.

In one embodiment, a broadcast (e.g., via the cellular network) can be utilized for multiple devices to receive the back-up media content. As described herein, signal quality and content quality evaluations can be performed to trigger the broadcast. For instance, the system 100 can monitor signal/content quality for multiple end user devices at multiple locations to determine whether the quality satisfies threshold(s). A broadcast over the cellular network 162 can be triggered responsive to a particular number of end user devices experiencing quality below the threshold. In one embodiment, other methods for transmitting the back-up content can be employed if the particular number of end user devices experiencing quality below the threshold is below a broadcast trigger threshold. For example, unicast(s) over the cellular network 162 can be employed where there are too few end user devices experiencing low-quality signal/content. In one embodiment, a minimum number of requests in a given area can be defined by a content service provider and/or by a cellular service provider in order for cellular broadcast functionality to be implemented for a geographic location. This minimum number of back-up content requests can also uniquely define geographic areas associated with each minimum (e.g., geo-fences).

In one or more embodiments, the end user device can trigger access to a broadcast of the back-up content over the cellular network 162. For example, a cellular broadcast may already be occurring for a group of devices in a geographic location. One or more other end user devices that are receiving the primary content stream may experience quality issues in which their received signal/content quality falls below the quality threshold. These end user devices can then join the existing cellular broadcast. For example, these end user devices can be programmed to use default frequencies for broadcast and can check whether or not a cellular broadcast is already being provided. In another example, these end user devices can check with the cellular network 162.

In one embodiment, if a broadcast is already being provided then these end user devices can be authenticated and can join an existing broadcast. If a broadcast is not already being provided then one or more of these end user devices can register a new request for a cellular broadcast. In one embodiment, the first end user device and a particular number of subsequent end user devices that request the broadcast back-up content can receive the back-up content via unicasts. Once the number of requests satisfies a cellular broadcast threshold for a geographic location then the unicasts can be transitioned to the cellular broadcast.

Figure 2:
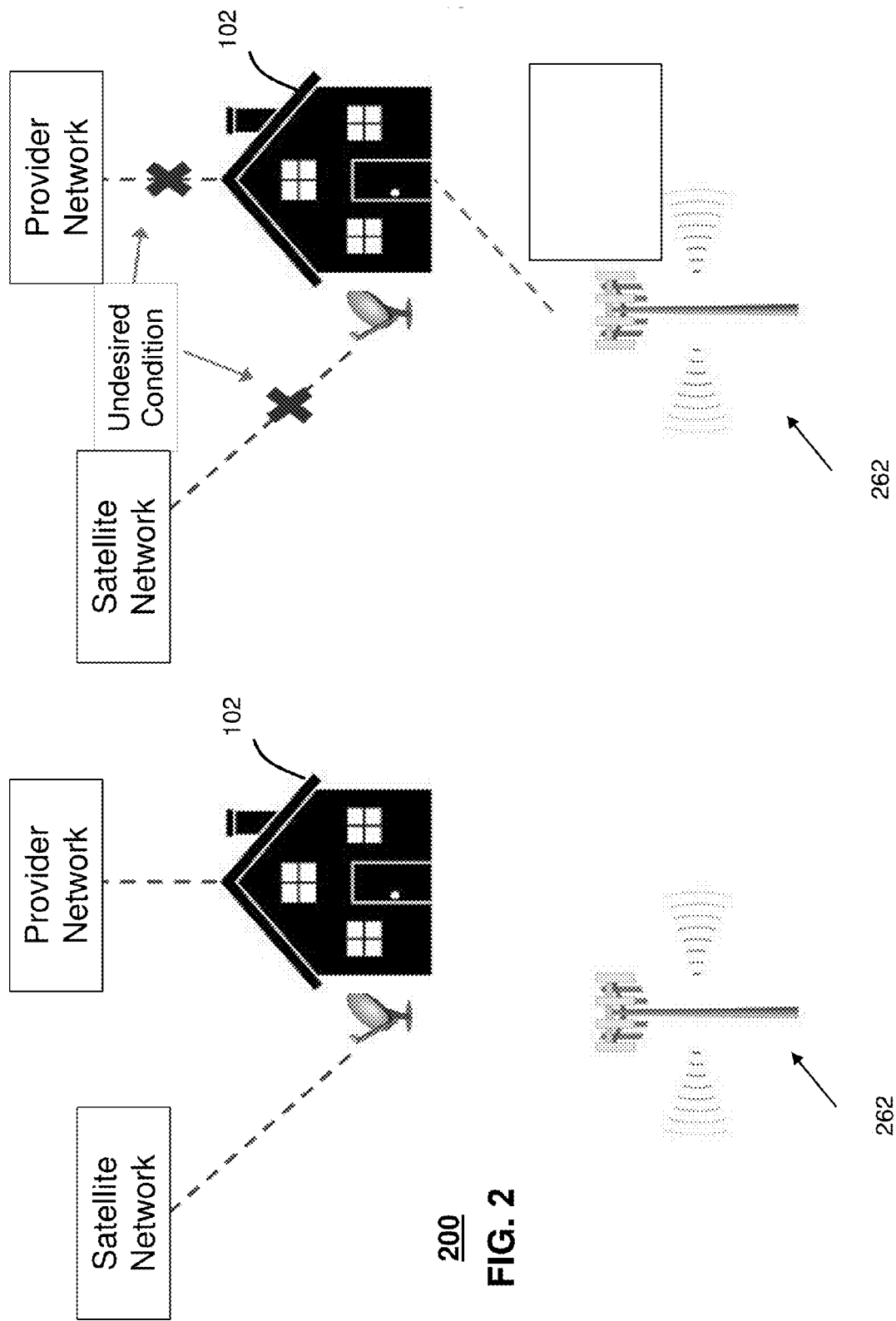

FIG. 2 depicts an illustrative embodiment of a system 200 that enables media services, such as delivery of media content, to be provided to end user equipment at location 102 via multiple communication paths that are over different networks. A media stream 110, such as a broadcast stream, can be received from a content source over one or more of various networks, such as a satellite network, an Internet Protocol Television Network, a cable network, an over-the-air network and/or any other network that provides television or video services.

Quality monitoring for the content being delivered to or being received at the location 102 can be performed. For instance, the user equipment at location 102 can apply one or more quality metrics to determine that the received content is below a desired threshold. In one embodiment, user input can be received at the user equipment indicating the received content is below a desired quality. For instance, the user, such as via a remote control, can input data indicating that an improved quality is desired. The input data can be provided in a message to the interactive television network to trigger a transition to delivery of the content via another network, such as cellular network 262. In another embodiment, the user input can be received by the interactive television network equipment along with one or more quality measurements (e.g., SNR and PSNR). The interactive television network equipment can then determine or otherwise predict whether the quality of content delivered via the cellular network 262 is of a higher quality than the content being delivered via the interactive television network.

In one embodiment, the interactive television network equipment can obtain quality metrics from one or more other end user equipment at other locations (e.g., in proximity the location 102) to facilitate the quality prediction for the content received over the cellular network 262. In another embodiment, the interactive television network equipment can obtain quality metrics from the end user equipment at location 102 and can determine if the content being received via the cellular network 262 is of a higher quality than the content received over the interactive television network.

The cellular network 262 can be utilized for establishing another communication path for delivery of the media content to the media processor 106 via a cellular device associated with the end user equipment of location 102. The cellular device can be a cellular receiver, transmitter and/or transceiver circuit that is integrated into a media processor or can be a separate device that has a cellular receiver, transmitter and/or transceiver circuit, such as a mobile phone.

In one embodiment, the location 102 can select among multiple communication paths for delivery of the media content. For instance, the location 102 can have two or more of satellite service, cable service or IPTV service. In the event that the content delivered via these services is below a quality threshold, the user equipment at location 102 can receive the content via the cellular network 262. In one embodiment, the cellular network 262 can utilize a multicast-broadcast single-frequency network channel for delivering the media content.

In one embodiment, system 200 can provide a content stream including first content to a media processor at location 102 over a first network, such as a satellite network, an IPTV network and/or a cable network. The system 200 can monitor maintenance events associated with the first network. Responsive to a determination that a maintenance event affects the providing of the content stream to the media processor, the system 200 can transmit a content transmission request to a network device of cellular network 262 that causes the network device to transmit second content over a multicast-broadcast single-frequency network channel of the cellular network to the media processor via a cellular device. The second content can correspond with the first content. The cellular device can be in communication with the media processor. The transmitting of the content transmission request can cause the media processor to replace a first presentation of the first content with a second presentation of the second content. In one embodiment, the determination that the maintenance event affects the providing of the content stream to the media processor can include evaluating a quality of the first content being received by the media processor according to a quality threshold and determining that the quality of the first content does not satisfy the quality threshold.

In one embodiment, the cellular device can be integrated with a mobile communication device, and the second content can be received by the media processor from the mobile communication device that receives the second content from a cellular content source over the multicast-broadcast single-frequency network channel of the cellular network 262.

Figure 3:
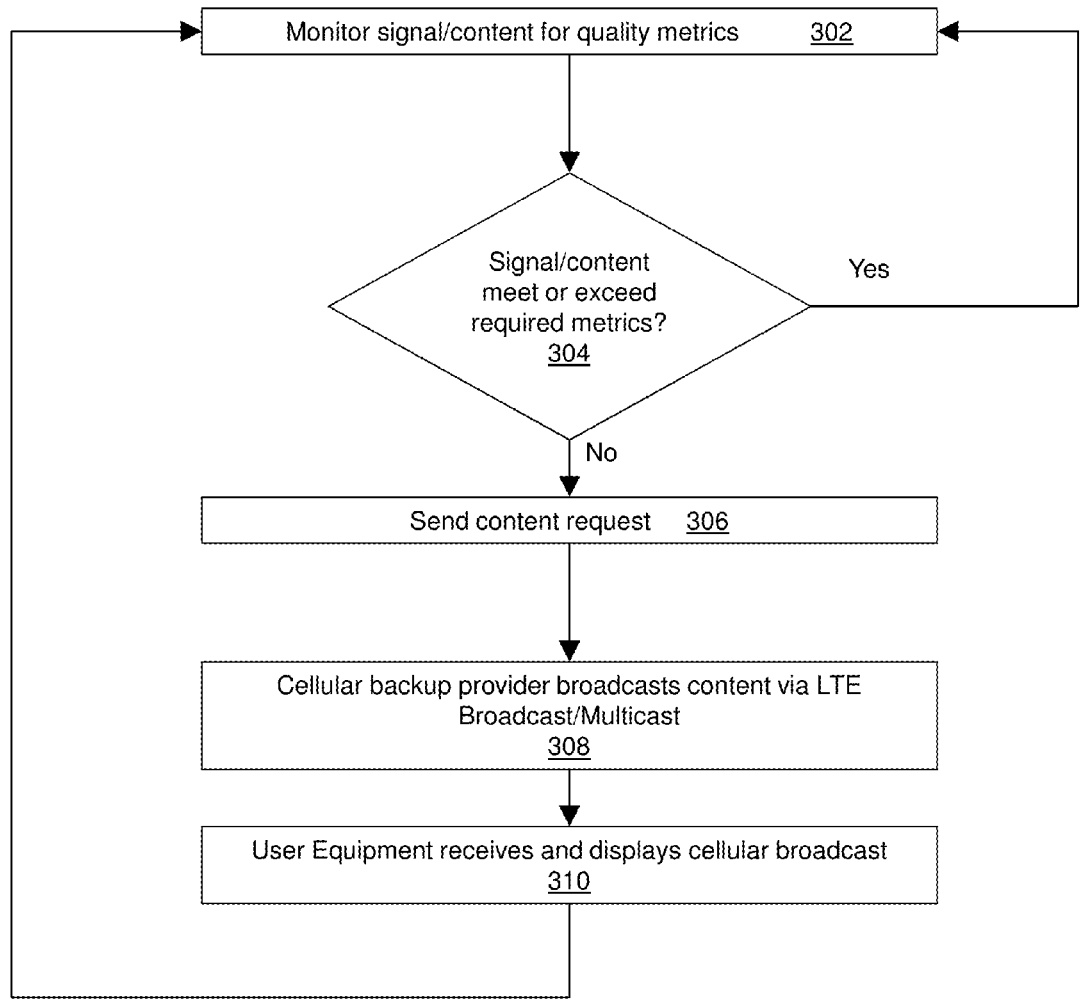
FIG. 3 depicts an illustrative embodiment of a method used in portions of the systems described in FIGS. 1 and 2.

FIG. 3 illustrates method 300 for delivering media services, such as delivery of media content, over multiple communication paths. Method 300 can commence at 302 with monitoring and evaluating a quality of first media content being received by a media processor, such as according to a quality threshold. The quality evaluation can be based on monitoring of the signals being transmitted and/or based on monitoring of the content being presented by the media processor. The evaluation can be performed by the user equipment (e.g., by the media processor) and/or by network equipment.

At 304, a determination as to whether the signal and/or received content satisfies a quality threshold can be made. The quality threshold can include multiple parameters which may or may not be weighted. For example, SNR and PSNR metrics can be evaluated and compared to a first quality threshold while another monitored quality metric is compared to a second quality threshold.

Responsive to a determination that the quality threshold (s) is satisfied, the monitoring at 302 can continue. Responsive to a determination that the quality of the first media content does not satisfy the quality threshold(s), a content request can be transmitted at 306. The content request can be transmitted by the user equipment and/or by the network equipment.

At 308, second media content can be provided to a cellular device over a multicast-broadcast single-frequency network channel of a cellular network. For example, a cellular backup provider can broadcast the second media content over an LTE Broadcast/Multicast in response to receiving a content request from one or both of the user equipment and the network equipment (of the interactive television network). The second media content can correspond with the first media content. The cellular device can be integrated with or separate from the media processor. At 310, the providing of the second media content can cause the media processor to replace a first presentation of the first media content with a second presentation of the second media content.

In one embodiment, the content request can include a geographic location of the media processor. In one embodiment, the evaluating of the quality of the first media content can be according to a quality message received from the media processor according to an evaluation of the first media content performed by the media processor. In one embodiment, a cease message can be transmitted that causes ceasing of the providing of the second media content over the multicast-broadcast single-frequency network channel of the cellular network. In one embodiment, the transmitting of the cease message can be responsive to a determination that the quality of the first media content satisfies the quality threshold. In one embodiment, the transmitting of the cease message can be responsive to a determination that the quality of the first media content is higher than a quality of the second media content.

Figure 4:
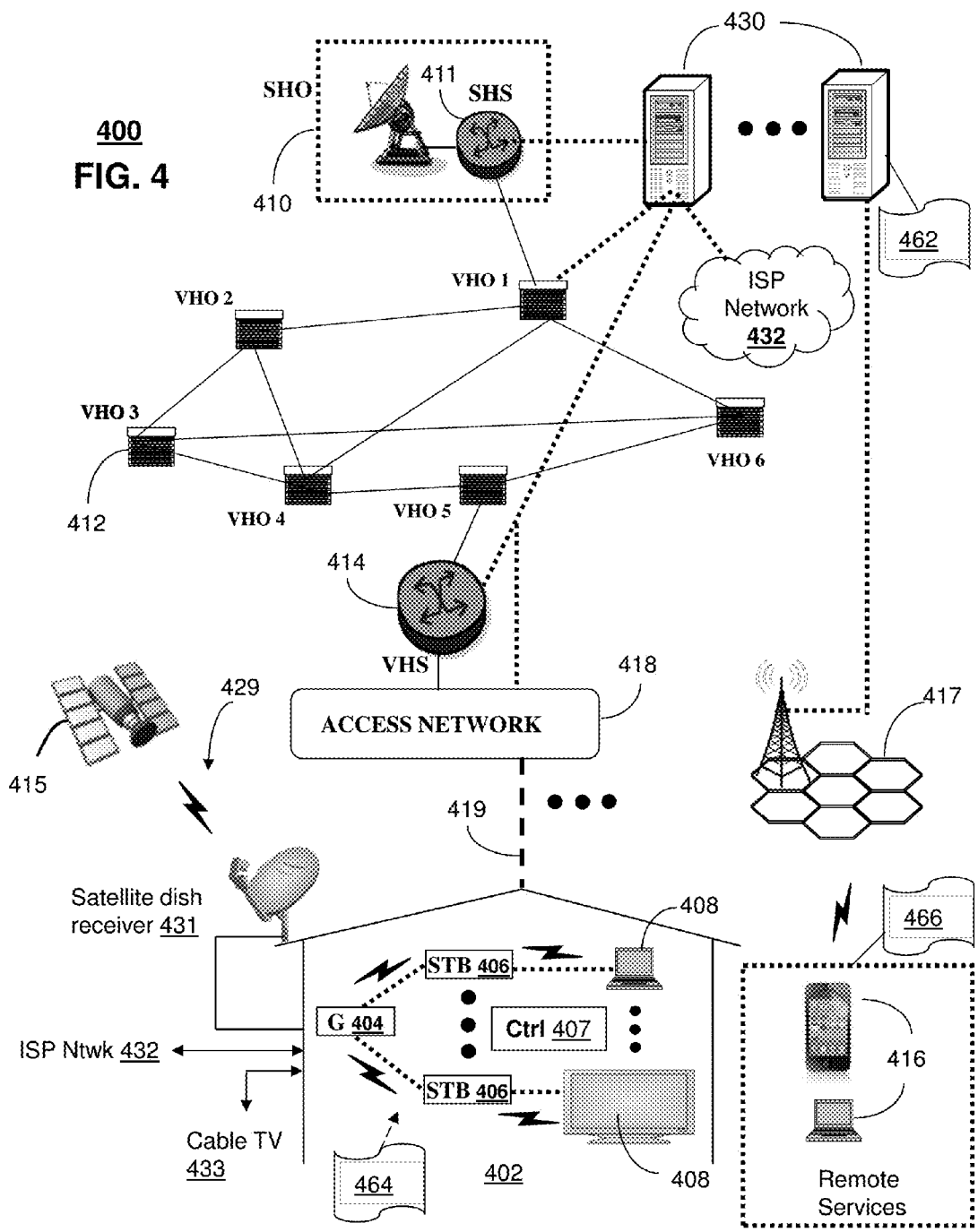
FIG. 4 depicts an illustrative embodiment of a communication system that provides media services including delivering media content and backup media content using multiple networks over different communication paths.

FIG. 4 depicts an illustrative embodiment of a communication system 400 for delivering media content and providing a backup path where the quality of the content is determined to fall below a desired level. The communication system 400 can represent an Internet Protocol Television (IPTV) media system. Communication system 400 can be overlaid or operably coupled with system 100-200 as another representative embodiment of communication system 400. For instance, one or more devices illustrated in the communication system 400 of FIG. 4 can receive, over a first network, a content stream including first media content and can evaluate a quality of the first media content according to a quality threshold. In this example, a content request can be transmitted responsive to a first determination that the quality of the first media content does not satisfy the quality threshold. Responsive to the content request, second media content can be received via a cellular device over a multicast-broadcast single-frequency network channel of a cellular network, where the second media content corresponds with the first media content. Second media content can then be presented via a display. Responsive to a second determination that the quality of the first media content satisfies the quality threshold, the presentation of the second media content can be ceased and the first media content can be presented via the display.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services.

The subject disclosure can apply to other present or next generation over-the-air and/or landline media content services system. Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a content replacement server (herein referred to as server 430). The server 430 can use computing and communication technology to perform function 462, which can include among other things, providing a content stream to a media processor over a first network where the content stream comprises first media content; evaluating a quality of the first media content according to a quality threshold; responsive to a determination that the quality of the first media content does not satisfy the quality threshold, providing to a cellular device second media content over a multicast-broadcast single-frequency network channel of a cellular network, where the second media content corresponds with the first media content, where the cellular device is in communication with the media processor, and where the providing of the second media content causes the media processor to replace a first presentation of the first media content with a second presentation of the second media content.

For instance, function 462 of server 430 can be similar to the functions described in system 100 and 200 for the network provider equipment of the interactive television networks, as well as in accordance with method 300. The media processors 406 and wireless communication devices 416 can be provisioned with software functions 464 and 466, respectively, to utilize the services of server 430. For instance, functions 464 and 466 of media processors 406 and wireless communication devices 416 can be similar to the functions described for the devices 106 and 116 in accordance with method 400.

In one embodiment, function 464 can include receiving, over a first network, a content stream comprising first media content; evaluating a quality of the first media content according to a quality threshold; transmitting a content request responsive to a first determination that the quality of the first media content does not satisfy the quality threshold; responsive to the content request, receiving, via a cellular device, second media content over a multicast-broadcast single-frequency network channel of a cellular network, wherein the second media content corresponds with the first media content; presenting, via a display, the second media content; and responsive to a second determination that the quality of the first media content satisfies the quality threshold, ceasing the presenting of the second media content and presenting, via the display, the first media content.

In another embodiment, function 466 can include receiving backup content over a cellular network via a multicast-broadcast single-frequency network channel of the cellular network and providing the backup content to a media processor. The backup content can be provided to the media processor utilizing a short range mode of communication, such as WiFi.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
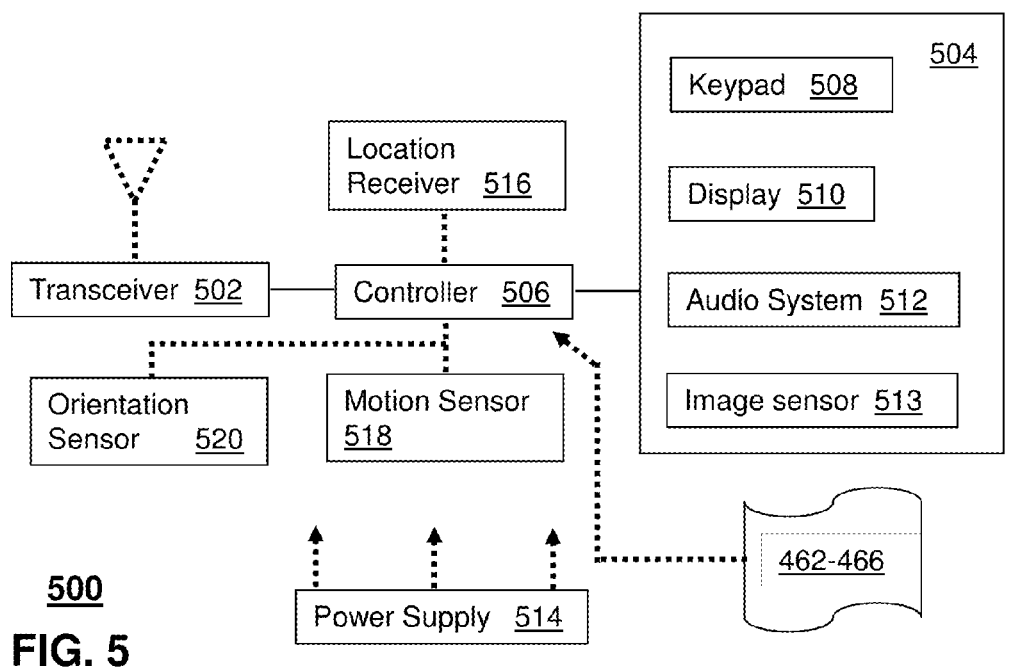
FIG. 5 depicts an illustrative embodiment of a communication device.

FIG. 5 depicts an illustrative embodiment of a communication device 500. Communication device 500 can serve in whole or in part as an illustrative embodiment of the devices depicted in systems 100-200 of FIGS. 1-2 and 400 of FIG. 4 and can be configured to perform portions of method 300 of FIG. 3.

For example, communication device 500 can be a media processor that provides video services, including broadcast, multicast and/or unicast services. Communication device 500 can have a cellular receiver and/or transmitter integrated therein or can be in communication with a separate cellular receiver and/or transmitter. Communication device 500 can receive, over a first network (e.g., an IPTV network, a cable network, a satellite network), a content stream comprising first media content; receive, via a cellular receiver, second content that is provided over a multicast-broadcast single-frequency network channel of a cellular network; and can replace the first media content with the second media content during a presentation via a display. The first and second media content can be the same content which may or may not have different formats.

Communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface with graphical user interface (GUI) elements that can be selected by a user with a touch of a finger. The touch screen display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable applications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a reset button (not shown). The reset button can be used to reset the controller 506 of the communication device 500. In yet another embodiment, the communication device 500 can also include a factory default setting button positioned, for example, below a small hole in a housing assembly of the communication device 500 to force the communication device 500 to re-establish factory settings. In this embodiment, a user can use a protruding object such as a pen or paper clip tip to reach into the hole and depress the default setting button. The communication device 500 can also include a slot for adding or removing an identity module such as a Subscriber Identity Module (SIM) card. SIM cards can be used for identifying subscriber services, executing programs, storing subscriber data, and so forth.

The communication device 500 as described herein can operate with more or less of the circuit components shown in FIG. 5. These variant embodiments can be used in one or more embodiments of the subject disclosure.

The communication device 500 can be adapted to perform the functions of the various devices of systems 100, 200 and 400. In addition, the controller 506 can be adapted in various embodiments to perform the functions 462-466, respectively.

Upon reviewing the aforementioned embodiments, it would be evident to an artisan with ordinary skill in the art that said embodiments can be modified, reduced, or enhanced without departing from the scope of the claims described below. For example, the delivery of backup content via an alternative communication path (e.g., a multicast-broadcast single-frequency network channel of a cellular network) can trigger revenue sharing between different service providers such as the cellular provider and the interactive television provider. In another embodiment, the delivery of the backup content over the cellular network can include determining transmission time based on various factors such as network congestion to facilitate a smooth transition between communication paths.

In one embodiment, the cellular transceiver can be integrated with a mobile device that is associated with a first subscription plan and the media processor presenting the media content can be associated with a second, different subscription plan. The mobile device can communicate with the media processor to determine whether the backup content should be delivered to the media processor via the mobile phone (over the cellular network). For example, the mobile phone and/or the media processor can evaluate the quality of the content. In one embodiment, the delivery of the cellular backup content via the mobile phone can be authorized according to a subscription agreement for the mobile device. In another embodiment, an additional cost can be applied to one or both of the subscription billings for the media processor and the mobile device for providing the cellular backup content.

Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 6:
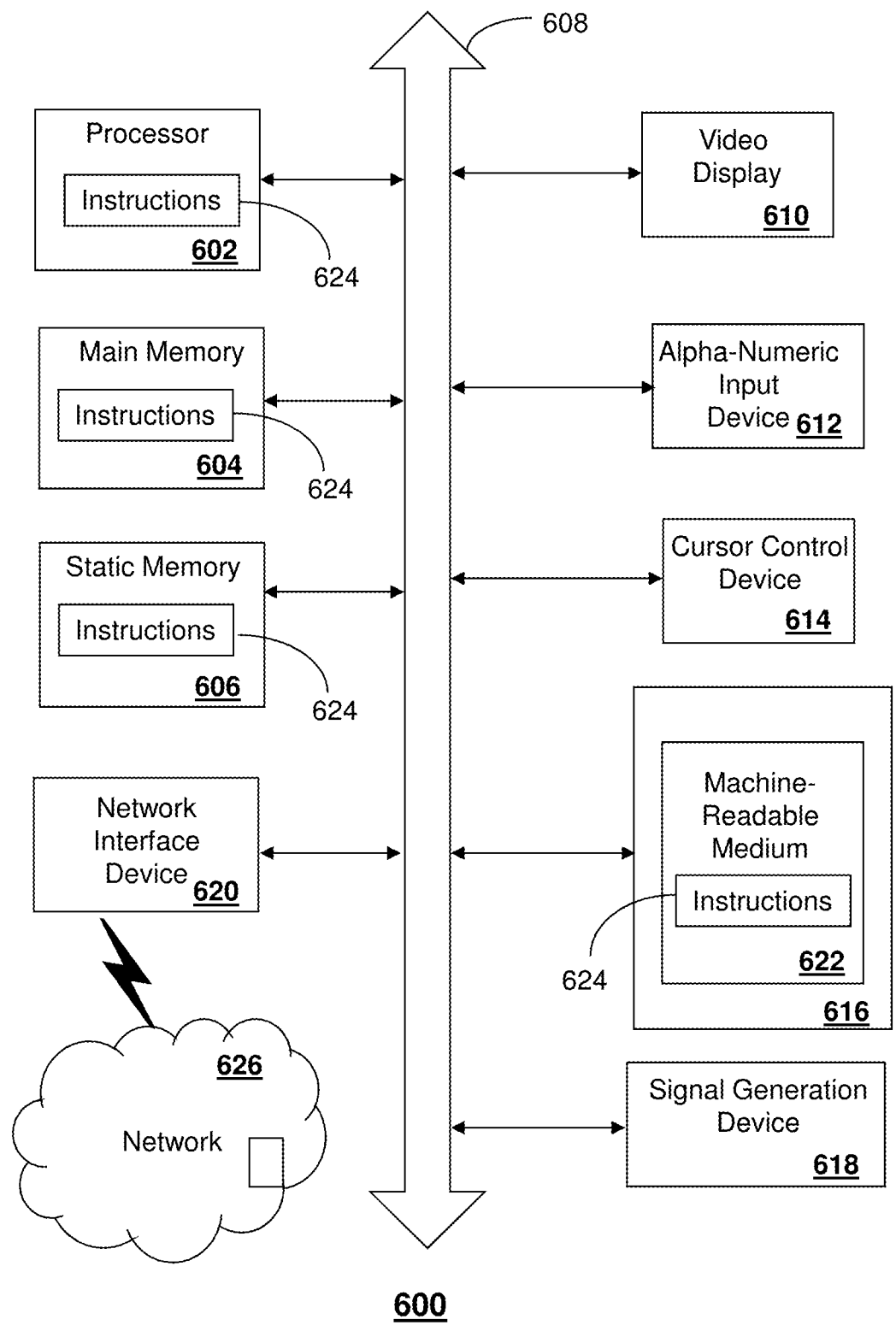
FIG. 6 is a diagrammatic representation of a machine in the form of a computer system within which a set of instructions, when executed, may cause the machine to perform any one or more of the methods described herein.

FIG. 6 depicts an exemplary diagrammatic representation of a machine in the form of a computer system 600 within which a set of instructions, when executed, may cause the machine to perform any one or more of the methods described above. One or more instances of the machine can operate, for example, as the devices of system 100, 200 and 400. In some embodiments, the machine may be connected (e.g., using a network 626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor (or controller) 602 (e.g., a central processing unit (CPU)), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display). The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 600.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A media processor comprising:
   a processing system including a processor; and
   a memory that stores executable instructions that, when executed by the processing system, facilitate performance of operations, comprising:
   receiving, over a first network, a content stream comprising first media content, wherein the first network is a non-cellular network, wherein the non-cellular network includes an interactive television network;
   evaluating a quality of the first media content according to a quality threshold;
   monitoring signals of a cellular network resulting in monitored signals;
   determining the monitored signals obtained from the cellular network satisfies the quality threshold;
   switching to a default frequency channel of a multicast-broadcast single-frequency network of the cellular network responsive to a first determination that the quality of the first media content does not satisfy the quality threshold and the monitored signals satisfy the quality threshold;
   responsive to switching to the default frequency channel, receiving, via a cellular device, second media content over the default frequency channel, wherein the second media content is a same content as the first media content, and wherein the second media content is received by a plurality of end user devices via a multicast-broadcast single-frequency process;
   presenting, via a display, the second media content; and
   responsive to a second determination that the quality of the first media content satisfies the quality threshold, ceasing the presenting of the second media content and presenting, via the display, the first media content.

2. The media processor of claim 1, wherein a cellular content source accesses the second media content from a broadcast content source that supplies the first media content over the first network.

3. The media processor of claim 1, wherein the first media content comprises video content having a first format, wherein the second media content comprises the video content having a second format, and wherein the monitored signals are different from the first media content and the second media content.

4. The media processor of claim 1, wherein the operations further comprise: transmitting a cease message that causes the receiving of the second media content over the multicast-broadcast single-frequency network to cease, and wherein the evaluating of the quality of the first media content is based on a signal-to-noise ratio analysis.

5. The media processor of claim 1, wherein the operations further comprise evaluating a second quality of the second media content according to the quality threshold, wherein the presenting of the second media content is responsive to a third determination that a quality of the second media content satisfies the quality threshold.

6. The media processor of claim 1, wherein the receiving of the content stream is via a unicast or multicast of the content stream over the first network, and wherein the evaluating of the quality of the first media content according to the quality threshold is based on user input.

7. The media processor of claim 1, wherein the cellular device is integrated with a mobile communication device, and wherein the receiving of the second media content is from the mobile communication device that receives the second media content from a cellular content source over the default frequency channel of the multicast-broadcast single-frequency network of the cellular network.

8. A method comprising:
   providing, by a processing system including a processor, a content stream to a media processor over a first network, wherein the content stream comprises first media content, and wherein the first network is non-cellular network, wherein the non-cellular network includes an interactive television network;
   evaluating, by the processing system, a quality of the first media content according to a quality threshold;
   monitoring signals of a cellular network resulting in monitored signals;
   determining the monitored signals provided on the cellular network satisfies the quality threshold;
   switching to a default frequency channel of a multicast-broadcast single-frequency network of the cellular network; and
   responsive to a determination that the quality of the first media content does not satisfy the quality threshold and the monitored signals satisfy the quality threshold, providing, by the processing system to a cellular device, second media content over the default frequency channel, wherein the second media content is a same content as the first media content, wherein the cellular device is in communication with the media processor, wherein the providing of the second media content causes the media processor to replace a first presentation of the first media content with a second presentation of the second media content, and wherein the second media content is provided to a plurality of end user devices via a multicast-broadcast single-frequency process.

9. The method of claim 8, wherein the evaluating of the quality of the first media content is based on a quality message received by the processing system from the media processor according to an evaluation of the first media content performed by the media processor.

10. The method of claim 8, wherein the cellular device is integrated with a mobile communication device, and wherein the providing of the second media content is to the mobile communication device over the multicast-broadcast single-frequency network of the cellular network which causes the communication device to transmit the second media content to the media processor.

11. The method of claim 8, wherein the providing of the content stream to the media processor over the first network is via a broadcast, and wherein the cellular device is integrated with the media processor.

12. The method of claim 8, further comprising transmitting, by the processing system, a cease message that causes ceasing of the providing of the second media content over the multicast-broadcast single-frequency network of the cellular network.

13. The method of claim 8, further comprising:
monitoring, by the processing system, a number of content requests in a geographic location,
wherein the providing of the second media content over the default frequency channel of the multicast-broadcast single-frequency network of the cellular network is responsive to a determination that the number of content requests satisfies a request threshold for the geographic location.

14. The method of claim 12, wherein the transmitting of the cease message is responsive to a determination that the quality of the first media content is higher than a quality of the second media content.

15. A machine-readable storage device, comprising executable instructions that, when executed by a processing system including a processor, facilitate performance of operations, comprising:
providing a content stream to a media processor over a first network, wherein the content stream comprises first media content, and wherein the first network is non-cellular network, wherein the non-cellular network includes an interactive television network;
monitoring maintenance events associated with the first network;
monitoring signals of a cellular network resulting in monitored signals;
determining the monitored signals provided on the cellular network satisfy a quality threshold; and
switching to a default frequency channel of a multicast-broadcast single-frequency network of the cellular network; and
responsive to a determination that a maintenance event affects the providing of the content stream to the media processor and the monitored signals satisfying the quality threshold, receiving a second media content over the default frequency channel to the media processor via a cellular device, wherein the second media content is a same content as the first media content, wherein the cellular device is in communication with the media processor, wherein the receiving of the second media content causes the media processor to replace a first presentation of the first media content with a second presentation of the second media content, and wherein the second media content is provided to a plurality of end user devices via a multicast-broadcast single-frequency process.

16. The machine-readable storage device of claim 15, wherein the determination that the maintenance event affects the providing of the content stream to the media processor comprises evaluating a quality of the first media content being received by the media processor according to the quality threshold and determining that the quality of the first media content does not satisfy the quality threshold, and wherein the monitored signals are different from the first media content and the second media content.

17. The machine-readable storage device of claim 15, wherein the cellular device is integrated with a mobile communication device, and wherein the second media content is received by the media processor from the mobile communication device that receives the second media content from a cellular content source over the default frequency channel of the multicast-broadcast single-frequency network channel of the cellular network.

* * * * *